(12) United States Patent
Frydman et al.

(10) Patent No.: US 9,642,169 B2
(45) Date of Patent: May 2, 2017

(54) METHODS, CIRCUITS, DEVICES, SYSTEMS AND ASSOCIATED COMPUTER EXECUTABLE CODE FOR FACILITATING ACCESS TO A CONTENT SOURCE THROUGH A WIRELESS MOBILE NETWORK

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD., Yokneam Illit (IL)

( * ) Notice: Subject to any disclaimer, the term of this patent is extended or adjusted under 35 U.S.C. 154(b) by 514 days.

(21) Appl. No.: 13/861,192

(22) Filed: Apr. 11, 2013

(65) Prior Publication Data

US 2013/0301626 A1    Nov. 14, 2013

Related U.S. Application Data

(63) Continuation-in-part of application No. 13/739,067, filed on Jan. 11, 2013.

(Continued)

(51) Int. Cl.
*H04W 4/00*       (2009.01)
*H04W 76/02*      (2009.01)
(Continued)

(52) U.S. Cl.
CPC .............. *H04W 76/02* (2013.01); *H04L 67/04* (2013.01); *H04L 67/141* (2013.01);
(Continued)

(58) Field of Classification Search
CPC ..... H04W 4/008; H04W 88/06; H04W 84/12; H04W 48/16; H04W 76/02
See application file for complete search history.

(56) References Cited

U.S. PATENT DOCUMENTS 7,343,397 B2 *  3/2008  Kochanski .................... 709/218
7,565,450 B2 *  7/2009  Garcia-Luna-Aceves et al. ............................ 709/245

(Continued)

*Primary Examiner* — Hosain Alam
*Assistant Examiner* — Nicholas Allen
(74) *Attorney, Agent, or Firm* — Vladimir Sherman; Professional Patent Solutions (57) ABSTRACT

Disclosed are methods, circuits, devices, systems and associated computer executable code for providing facilitating communication between a mobile device application and a content source accessible through a mobile communication network having one or more wireless access points. There is disclosed a start of Service Accelerator ("SOSA") functionally associate with a wireless access point of the mobile communication network, where the SOSA includes: (1) one or more data stream sniffers adapted to detect and extract start of service sequence (SOSS) data associated with a first Mobile Device Application initiating start of service with a given content source; (2) a Data Request Routing & Handshake Cache (DRRHC) adapted to store Network SOSS Entities associated with the given content source; and (3) a Route Request and Handshake Responder (RRHR) adapted to respond to Application SOSS Entities from a second Mobile Device Application which is initiating start of service with the given content source using Network SOSS Entities stored on said DRRHC.

30 Claims, 5 Drawing Sheets

Related U.S. Application Data (60) Provisional application No. 61/622,574, filed on Apr. 11, 2012, provisional application No. 61/723,356, filed on Nov. 7, 2012, provisional application No. 61/585,251, filed on Jan. 11, 2012.

(51) Int. Cl.
  *H04L 29/08* (2006.01)
  *H04W 80/06* (2009.01)
  *H04L 29/12* (2006.01)

(52) U.S. Cl.
  CPC ...... *H04L 67/2861* (2013.01); *H04L 61/1511* (2013.01); *H04L 67/02* (2013.01); *H04W 80/06* (2013.01)

(56) References Cited

U.S. PATENT DOCUMENTS

| | | | |
|---|---|---|---|
| 7,567,582 B2* | 7/2009 | Westhead et al. | 370/428 |
| 7,930,428 B2* | 4/2011 | Drako | 709/245 |
| 7,962,569 B2* | 6/2011 | Sewall et al. | 709/217 |
| 8,117,296 B2* | 2/2012 | Liu et al. | 709/223 |
| 8,204,948 B2* | 6/2012 | Drako et al. | 709/206 |
| 8,458,298 B2* | 6/2013 | Josefsberg et al. | 709/220 |
| 8,484,377 B1* | 7/2013 | Chen et al. | 709/245 |
| 8,601,160 B1* | 12/2013 | Sargent | 709/245 |
| 2002/0194244 A1* | 12/2002 | Raventos | 709/101 |
| 2006/0193284 A1* | 8/2006 | Stieglitz | H04L 63/0492 370/328 |
| 2007/0188298 A1* | 8/2007 | Tariq et al. | 340/5.8 |
| 2008/0025278 A1* | 1/2008 | Hoecker | H04W 76/02 370/338 |
| 2008/0026726 A1* | 1/2008 | Tariq et al. | 455/411 |
| 2008/0049630 A1* | 2/2008 | Kozisek | H04L 41/0823 370/250 |
| 2008/0072305 A1* | 3/2008 | Casado | H04L 63/0492 726/11 |
| 2008/0140847 A1* | 6/2008 | Almog | 709/228 |
| 2008/0229020 A1* | 9/2008 | Plamondon | 711/122 |
| 2008/0285520 A1* | 11/2008 | Forte | H04W 36/0011 370/331 |
| 2008/0320151 A1* | 12/2008 | McCanne et al. | 709/228 |
| 2009/0180451 A1* | 7/2009 | Alpert et al. | 370/338 |
| 2009/0210293 A1* | 8/2009 | Steele et al. | 705/10 |
| 2009/0327487 A1* | 12/2009 | Olson et al. | 709/224 |
| 2010/0235409 A1* | 9/2010 | Roy et al. | 707/812 |
| 2010/0268814 A1* | 10/2010 | Cross | H04L 29/12066 709/224 |
| 2010/0325240 A1* | 12/2010 | Drako et al. | 709/217 |
| 2010/0332615 A1* | 12/2010 | Short et al. | 709/217 |
| 2011/0075633 A1* | 3/2011 | Johansson et al. | 370/331 |
| 2011/0106919 A1* | 5/2011 | Mazur et al. | 709/220 |
| 2011/0153807 A1* | 6/2011 | Vicisano et al. | 709/224 |
| 2011/0154026 A1* | 6/2011 | Edstrom et al. | 713/158 |
| 2011/0182227 A1* | 7/2011 | Rune | 370/312 |
| 2011/0320524 A1* | 12/2011 | Nandagopal | 709/203 |
| 2012/0017009 A1* | 1/2012 | Short et al. | 709/238 |
| 2012/0124239 A1* | 5/2012 | Shribman et al. | 709/245 |
| 2014/0059071 A1* | 2/2014 | Frydman et al. | 707/769 |

* cited by examiner

FIG. 3

METHODS, CIRCUITS, DEVICES, SYSTEMS AND ASSOCIATED COMPUTER EXECUTABLE CODE FOR FACILITATING ACCESS TO A CONTENT SOURCE THROUGH A WIRELESS MOBILE NETWORK

CROSS REFERENCE

The present application claims the priority of U.S. Provisional Patent Applications 61/622,574, filed Apr. 11, 2012, and U.S. Provisional Patent Application 61/723,356, filed Nov. 7, 2012, the disclosures of which are incorporated herein by reference in their entirety.

The present application is also a Continuation in Part of U.S. patent application Ser. No. 13/739,067, filed Jan. 11, 2013 entitled "METHODS, CIRCUITS, DEVICES, SYSTEMS AND ASSOCIATED COMPUTER EXECUTABLE CODE FOR PROVIDING DOMAIN NAME RESOLUTION", which claims the benefit of U.S. Provisional Patent Application 61/585,251, filed Jan. 11, 2012, the disclosures of which are incorporated herein by reference in their entirety.

FIELD OF THE INVENTION

Some embodiments relate generally to the field data communication. More specifically, some embodiments relate to facilitating data communication between a mobile device application and a content source communicatively coupled through a mobile data network.

BACKGROUND

Remote on-demand access to computer and communication network resources, including Internet access is widespread. With the Internet becoming increasingly popular, more network users are able to connect to a remote server through any device with an internet connection. Users are able to connect to the Internet from home computers, laptops, tablets, smart phones, e-book readers, and any other mobile Internet device. When connected to the internet, users often download or stream significant amounts of data from various data sources, such as websites, media servers and Application Servers, hosted on servers connected to the internet or Content Delivery Networks (CDN's).

Data servers, Media Servers and Application Engines connected to a data network, such as the Internet, at one or more network nodes are typically identifiable and addressable using an Internet Protocol (e.g. IP v4 and v6) address. Websites and other data sources connected to the Internet are, however, typically associated with a server name or domain name. The Domain Name System (DNS) is a hierarchical distributed naming system for computers, services, or any resource connected to the Internet or a private network. It associates various information with domain names assigned to each of the participating entities. A Domain Name Service resolves queries for these names into IP addresses for the purpose of locating computer services and devices either on a local network or worldwide on the Internet. By providing a worldwide, distributed keyword-based redirection service, the Domain Name System is an essential component of the functionality of the Internet.

An often-used analogy to explain the Domain Name System is that it serves as the phone book for the Internet by translating human-friendly computer hostnames into IP addresses. For example, the domain name www.example-.com translates to the addresses 192.0.43.10 (IPv4) and 2620:0:2d0:200::10 (IPv6). Unlike a phone book, DNS can be quickly updated and these updates are distributed, allowing a service's location on the network to change without affecting the end users, who continue to use the same hostname. Users take advantage of this when they recite meaningful Uniform Resource Locators (URLs) and e-mail addresses without having to know how the computer actually locates the services.

The Domain Name System distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism has made the DNS distributed and fault tolerant and has helped avoid the need for a single central register to be continually consulted and updated. Additionally, the responsibility for maintaining and updating the master record for the domains is spread among many domain name registrars, who compete for the end-user's, domain-owner's, business. Domains can be moved from registrar to registrar at any time. The Domain Name System also specifies the technical functionality of this database service. It defines the DNS protocol, a detailed specification of the data structures and communication exchanges used in DNS, as part of the Internet Protocol Suite.

The Internet maintains two principal namespaces, the domain name hierarchy and the Internet Protocol (IP) address spaces. The Domain Name System maintains the domain name hierarchy and provides translation services between it and the address spaces. Internet name servers and a communication protocol implement the Domain Name System. A DNS name server is a server that stores the DNS records for a domain name, such as address (A) records, name server (NS) records, and mail exchanger (MX) records (see also list of DNS record types); a DNS name server responds with answers to queries against its database.

The growing demand for packet data (e.g. TCP/IP) services over mobile networks, including: (1) mixed and rich content websites, (2) video and audio content streaming, has fostered enormous bandwidth and data traffic requirements for mobile communication/access networks. A single web-page may include URL's to multiple content sources, static and dynamic, and the loading of a single webpage may typically require between 15 and 20 DNS transactions with a remote DNS server. During peak network traffic hours, these requests may take between 3 and 4 seconds, thereby leading to a long delay in start of service and to customer frustration.

Additionally, Since in 2009 the volume of data traffic over mobile network exceeded that of voice traffic, mobile data has more or less tripled each year in volume thus taking over more and more of the mobile traffic in volume. On the profitability side, mobile data opens new revenue possibilities to the MNOs. A major obstacle standing before the MNOs, however, is their inability to connect to the content thus suffering from the Over-The-Top (OTT) syndrome. In addition, many of the applications generate data that withholds inflexible requirement on the way traffic should be served over the network. In order to enable adequate user experience, the data must be supplied to the UE according to strict bit-rate requirements. Any deviations from these requirements automatically lead to lousy experience thus to the abandonment of this service by consumers.

An additional important factor is the protocol used to pass data over the network—TCP. Wireless networks are characterized by high losses due to radio propagation impairments, high delays, and limited bandwidth. Small scale degradations over the air interface, such as fast fading, induce fluctuations, and losses over the air interface are mistakenly taken as congestion over the fixed networks by TCP. Although radio link control mechanisms typically use retransmissions to achieve error free communications over the air interface, these radio retransmissions cause delays that are large compared to TCP timescales, resulting in degradation of end-to-end throughput through the network. A major issue is that TCP misinterprets errors over wireless links as congestions and reacts by retransmitting TCP segments and by reducing the congestion window and thus the overall application throughput. The main factors driving the TCP performance are the TCP roundtrip delay and Packet loss. Reducing the RTT and packet loss can dramatically improve the TCP behavior and thus the way data is passing over the network.

Irrespective of the cause of packet delay between an application running on a wireless communication device and a content source, there is a need in the field of mobile wireless device communication to accelerate communication session setup and content access between applications running on mobile network client devices and content sources accessible through the mobile network.

SUMMARY OF THE INVENTION

The present invention includes methods, circuits, devices, apparatuses, systems and associated computer executable code for providing data connectivity between an application running on a mobile communication device (hereinafter "Mobile Device Application"), which device (hereinafter "Mobile Device") is communicatively coupled to a Network Access Zone ("NAZ") of a wireless data network and/or of a cellular mobile network (hereafter "Wireless Mobile Network" or "Mobile Network"), and a content source such as a data server, media server, application server, application engine and/or CDN (hereinafter "Content Source") accessible through the Mobile Network. According to embodiments, there may be provided a Start of Service Accelerator ("SOSA") functionally associated with one or more NAZ's of the Mobile Network, which SOSA may be adapted to facilitate data connectivity between mobile communication devices (Mobile Devices), wirelessly connected to Access Points of the one or more NAZ's of the Mobile Network, and one or more Content Sources. The Mobile Network may include a Network Core (NC) and one or more NAZ's, some or all of which NAZ's may be functionally associated with one or more separate SOSA's. A NAZ according to embodiments may include: (1) a single wireless access point, base-station and/or cell site (hereinafter "Access Point" or "AP"), and/or may include (2) any combination of access points, base-stations and/or cell sites in geographic or communicational proximity with one another (hereinafter collectively "Access Points" or "AP's").

The present invention may further include methods, circuits, apparatuses, systems and associated computer executable code for providing and optionally accelerating access to (e.g. application related) content through an AP of a NAZ of a Mobile Network. According to some embodiments, one or more data processing appliances at or in communicative proximity with an AP may include or be otherwise functionally associated with a Data Request Routing & Handshake Cache (DRRHC) adapted to store information such as DNS request responses, TCP sync responses and HTTP re-directs relating to one or more specific Content Sources (e.g. content servers) accessible through the Mobile Network. The DRRHC may be part of a Start of Service Accelerator (SOSA), which SOSA may also include and/or be functionally associated with: (1) a Route Request and Handshake Detector (RRHD) adapted to detect DNS queries and TCP sync request generated by an application attempting to access a specific content source, and (2) a Route Request and Handshake Responder (RRHR) adapted to respond to detected DNS queries and TCP sync requests when the requested information is found in the DRRHC. The combination of DNS queries, DNS responses, TCP sync requests, TCP sync responses, HTTP gets, HTTP re-directs and/or any other data entities generated in connection with a Mobile Device Application initiating start of service and/or requesting data from a Content Sources may be termed a Start of Service Sequence (SOSS). The portion or data entities (e.g. packets, queries, requests, gets) of the SOSS generated by the Mobile Device Application may be referred to as Application SOSS Entities. The portion or data entities (e.g. packets) of the SOSS generated by network elements or network entities, such as a DNS, a router, a server or the like, may be referred to as Network SOSS Entities.

According to some embodiments, a Start of Service Accelerator ("SOSA") may be functionally associate with a Wireless Access Point of a Mobile Network and may include or be functionally associated with a one or more data stream sniffers adapted to detect and extract start of service sequence (SOSS) data associated with a first Mobile Device Application initiating start of service with a given content source. The one or more sniffers may include or be functionally associated with a Route Request and Handshake Detector (RRHD.). A Data Request Routing & Handshake Cache (DRRHC) may be adapted to store Network SOSS Entities associated with the given content source, for example the DRRHC may be adapted to store Network SOSS Entities generated by a target DNS and target routers associated with the given content source in response to Application SOSS Entities generated the first Mobile Device Application. The SOSA may also include a Route Request and Handshake Responder (RRHR) adapted to respond to Application SOSS Entities from a second Mobile Device Application initiating start of service with the given content source with a response based on Network SOSS Entities stored on said DRRHC or an otherwise associated cache.

The one or more of data stream sniffers may include an uplink sniffer functionally associated with the Route Request and Handshake Detector (RRHD). The upstream sniffer may detect, duplicate and/or extract upstream Mobile Device Application data within for example an uplink tunnel of the Mobile Network, and the RRHD may detect within that data Application SOSS Entities. The one or more sniffers may also include a downlink sniffer functionally associated with the same or another Route Request and Handshake Detector (RRHD). The downstream sniffer may detect, duplicate and/or extract downstream Network Element generated data within for example a downlink tunnel of the Mobile Network, and the RRHD may detect within that data Network SOSS Entities.

An SOSA according embodiments may also include a downlink data interceptor adapted to selectively block Network SOSS Entities from reaching a Mobile Device Application. The downlink data interceptor may be adapted to block Network SOSS Entities from reaching a Mobile Device Application whose detected corresponding Application SOSS Entities were already responded to by the RRHR.

According to embodiments, the SOSA may further include a cache updater adapted to append and update SOSS associated records in said DRRHC. The cache updater may be adapted to append to the DRRHC one or more records including Network SOSS Entities generated by a target DNS in response to a given set of Application SOSS Entities when records with Network SOSS Entities corresponding to the given set of Application SOSS Entities are not found in said DRRHC. The cache updater may also be adapted to update one or more records in said DRRHC associated with a given content source with Network SOSS Entities generated by a target DNS, target router, etc., when the one or more records in the DRRHC are outdated. DRRHC records including Network SOSS Entities associated with a given Content Source may be searchable and/or indexed by Application SOSS Entities usable for referencing and/or accessing the given Content Source.

The SOSA according to embodiments may further include a redirection module adapted to trigger a HTTP redirect in response to a Mobile Device Application HTTP request detected in the Application SOSS stream. The HTTP redirection module may include HTTP redirect logic and an HTTP redirect cache, and the redirection module may signal the Route Request and Handshake Responder (RRHR) to respond to the detected Mobile Device Application HTTP request with a redirect response stored in the HTTP redirect cache. The HTTP redirect cache may be discrete, part of the DRRHC or part of any other functionally associated cache.

Although a DNS query, TCP sync and/or HTTP request (Get) generated by an Mobile Device Application and targeting a given Content Source may be forward to a target DNS and target router associated with the given Content Source, the SOSA may be adapted to block reception of the DNS query response and the TCP sync response, generated by the target DNS and target router, from reaching the Mobile Device Application which generated the query and request. Blocking of these responses may be performed, for example, when sufficiently current records responsive to the DNS query and TCP sync request are found in the DRRHC. The SOSA may also be adapted to allow reception of the DNS query response and the TCP sync response generated by the target DNS and target router to reach the application which generated the query and request, for example when sufficiently current/updated records responsive to the DNS query and TCP sync request are not found in the DRRHC.

The SOSA may further be adapted to append one or more records to the DRRHC with DNS response and TCP sync response information from respective target network elements associated with the given content source when said information is absent from the DRRHC. The SOSA may be further adapted to update one or more records of the DRRHC with DNS response and TPC sync response information from respective target network elements associated with the given content source when said information is different from that information stored in corresponding records stored of the DRRHC.

According to some embodiments, the Content Source may be integral or otherwise functionally associated with the Mobile Network. Alternatively, the Content Source may be remote from the Mobile Network and may be accessed either through the public internet or through a content delivery/distribution network (CDN) accessible to the Mobile Network or via any other manner. According to further embodiments, data sent from the Content Source to the Mobile Device Application may be received at the Mobile Network through a (TCP/IP) or other protocol network gateway associated with either the Mobile Network Core or with the NAZ of the mobile communication device.

A given SOSA according to embodiments may be communicatively coupled to one or more Access Points associated with one or more NAZ's and may perform any combination of the following functions: (1) Domain Name System (DNS) functions, (2) physical port routing, (3) Internet or external network gateway functions, (4) Network Address Translation (NAT), and (5) NC tunnel data sniffing, data interception and/or data endpoint functions. Accordingly, the SOSA may include or be functionally associated with AP interface circuits and/or AP interface applications providing data connectivity with one or more Mobile Network Access Points. The interface to the Access Points may either be direct or may be through other access network hardware. The SOSA may include or be functionally associated with NC interface circuits and/or NC interface applications providing data connectivity with the NC. The interface to the NC may either be direct or may be through other access network hardware.

A given SOSA may also include or be functionally associated with a DNS server, database and/or cache (hereinafter "DNS"), which DNS may provide domain name resolution services to an Mobile Device Application running on a mobile device requesting DNS service through any of the one or more access points associated with the given SOSA. A DNS associated with a given SOSA and/or a given NAZ may be referred to as a Zone Specific Domain Name System (ZSDNS). Exemplary structures and functionalities of a ZSDNS are described in co-pending U.S. patent application Ser. No. 13/739,067, the teachings of which are hereby incorporated by reference in their entirety. The ZSDNS cache may be a part of the SOSA's DRRHC or may be accessed by the SOSA as a primary or a secondary DNS cache when a record for a given DNS query is not found in the DRRHC.

According to some embodiments, there may be provided an HTTP redirection module, which redirection module may include redirection logic and one or more redirection cache(s). The redirection module may store in the one or more redirection caches HTTP redirects associated with content requests for content from various content sources. The HTTP redirects may point to alternative sources of requested content, for example sources which may be communicatively closer and/or more available to the requesting Mobile Device Application than a Content Source to which the Mobile Device Application's HTTP content request was addressed. Some or all of the redirection logic and/or redirection cache(s) may be discrete, or may be part of a ZSDNS or a DRRHC, each of which ZSDNS or DRRHC may be part of an SOSA.

According to embodiments, an HHTP redirection module be configured with and/or may detect redirection responses for specific HTTP content requests. The redirection module may include, maintain and optionally update a cache include redirection responses to content requests from Content Sources having better and/or cheaper alternative sources. According to some embodiments, the alternative Content Source to which an HTTP request may be redirected may be: (1) part of a CDN integral of otherwise functionally associated with the Mobile Network and/or with a specific NAZ of the Mobile Network, (2) an element of a local content caching system integral of otherwise functionally associated with the Mobile Network and/or with a specific NAZ of the Mobile Network.

It should be understood that according to some embodiments, each of the separate caching entities mentioned may be implemented as separate caches, while according to other embodiments two or more of the caching entities may be combined into a single cache. Likewise, each of the modules, digital logics, data sniffing/detection elements, data blocking/injecting/responding elements, interface elements, network elements and/or decision making elements may be implemented separately and/or combined into the functionality of other Mobile Network associated hardware.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can comprise, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

The present invention includes methods, circuits, devices, apparatuses, systems and associated computer executable code for providing data connectivity between an application running on a mobile communication device (hereinafter "Mobile Device Application"), which device (hereinafter "Mobile Device") is communicatively coupled to a Network Access Zone ("NAZ") of a wireless data network and/or of a cellular mobile network (hereafter "Wireless Mobile Network" or "Mobile Network"), and a content source such as a data server, media server, application server, application engine and/or CDN (hereinafter "Content Source") accessible through the Mobile Network. According to embodiments, there may be provided a Start of Service Accelerator ("SOSA") functionally associated with one or more NAZ's of the Mobile Network, which SOSA may be adapted to facilitate data connectivity between mobile communication devices (Mobile Devices), wirelessly connected to Access Points of the one or more NAZ's of the Mobile Network, and one or more Content Sources. The Mobile Network may include a Network Core (NC) and one or more NAZ's, some or all of which NAZ's may be functionally associated with one or more separate SOSA's. A NAZ according to embodiments may include: (1) a single wireless access point, base-station and/or cell site (hereinafter "Access Point" or "AP"), and/or may include (2) any combination of access points, base-stations and/or cell sites in geographic or communicational proximity with one another (hereinafter collectively "Access Points" or "AP's").

The present invention may further include methods, circuits, apparatuses, systems and associated computer executable code for providing and optionally accelerating access to (e.g. application related) content through an AP of a NAZ of a Mobile Network. According to some embodiments, one or more data processing appliances at or in communicative proximity with an AP may include or be otherwise functionally associated with a Data Request Routing & Handshake Cache (DRRHC) adapted to store information such as DNS request responses, TCP sync responses and HTTP re-directs relating to one or more specific Content Sources (e.g. content servers) accessible through the Mobile Network. The DRRHC may be part of a Start of Service Accelerator (SOSA), which SOSA may also include and/or be functionally associated with: (1) a Route Request and Handshake Detector (RRHD) adapted to detect DNS queries and TCP sync request generated by an application attempting to access a specific content source, and (2) a Route Request and Handshake Responder (RRHR) adapted to respond to detected DNS queries and TCP sync requests when the requested information is found in the DRRHC. The combination of DNS queries, DNS responses, TCP sync requests, TCP sync responses, HTTP gets, HTTP re-directs and/or any other data entities generated in connection with a Mobile Device Application initiating start of service and/or requesting data from a Content Sources may be termed a Start of Service Sequence (SOSS). The portion or data entities (e.g. packets, queries, requests, gets) of the SOSS generated by the Mobile Device Application may be referred to as Application SOSS Entities. The portion or data entities (e.g. packets) of the SOSS generated by network elements or network entities, such as a DNS, a router, a server or the like, may be referred to as Network SOSS Entities.

According to some embodiments, a Start of Service Accelerator ("SOSA") may be functionally associate with a Wireless Access Point of a Mobile Network and may include or be functionally associated with a one or more data stream sniffers adapted to detect and extract start of service sequence (SOSS) data associated with a first Mobile Device Application initiating start of service with a given content source. The one or more sniffers may include or be functionally associated with a Route Request and Handshake Detector (RRHD.). A Data Request Routing & Handshake Cache (DRRHC) may be adapted to store Network SOSS Entities associated with the given content source, for example the DRRHC may be adapted to store Network SOSS Entities generated by a target DNS and target routers associated with the given content source in response to Application SOSS Entities generated the first Mobile Device Application. The SOSA may also include a Route Request and Handshake Responder (RRHR) adapted to respond to Application SOSS Entities from a second Mobile Device Application initiating start of service with the given content source with a response based on Network SOSS Entities stored on said DRRHC or an otherwise associated cache.

The one or more of data stream sniffers may include an uplink sniffer functionally associated with the Route Request and Handshake Detector (RRHD). The upstream sniffer may detect, duplicate and/or extract upstream Mobile Device Application data within for example an uplink tunnel of the Mobile Network, and the RRHD may detect within that data Application SOSS Entities. The one or more sniffers may also include a downlink sniffer functionally associated with the same or another Route Request and Handshake Detector (RRHD). The downstream sniffer may detect, duplicate and/or extract downstream Network Element generated data within for example a downlink tunnel of the Mobile Network, and the RRHD may detect within that data Network SOSS Entities.

An SOSA according embodiments may also include a downlink data interceptor adapted to selectively block Network SOSS Entities from reaching a Mobile Device Application. The downlink data interceptor may be adapted to block Network SOSS Entities from reaching a Mobile Device Application whose detected corresponding Application SOSS Entities were already responded to by the RRHR.

According to embodiments, the SOSA may further include a cache updater adapted to append and update SOSS associated records in said DRRHC. The cache updater may be adapted to append to the DRRHC one or more records including Network SOSS Entities generated by a target DNS in response to a given set of Application SOSS Entities when records with Network SOSS Entities corresponding to the given set of Application SOSS Entities are not found in said DRRHC. The cache updater may also be adapted to update one or more records in said DRRHC associated with a given content source with Network SOSS Entities generated by a target DNS, target router, etc., when the one or more records in the DRRHC are outdated. DRRHC records including Network SOSS Entities associated with a given Content Source may be searchable and/or indexed by Application SOSS Entities usable for referencing and/or accessing the given Content Source.

The SOSA according to embodiments may further include a redirection module adapted to trigger a HTTP redirect in response to a Mobile Device Application HTTP request detected in the Application SOSS stream. The HTTP redirection module may include HTTP redirect logic and an HTTP redirect cache, and the redirection module may signal the Route Request and Handshake Responder (RRHR) to respond to the detected Mobile Device Application HTTP request with a redirect response stored in the HTTP redirect cache. The HTTP redirect cache may be discrete, part of the DRRHC or part of any other functionally associated cache.

Although a DNS query, TCP sync and/or HTTP request (Get) generated by an Mobile Device Application and targeting a given Content Source may be forward to a target DNS and target router associated with the given Content Source, the SOSA may be adapted to block reception of the DNS query response and the TCP sync response, generated by the target DNS and target router, from reaching the Mobile Device Application which generated the query and request. Blocking of these responses may be performed, for example, when sufficiently current records responsive to the DNS query and TCP sync request are found in the DRRHC. The SOSA may also be adapted to allow reception of the DNS query response and the TCP sync response generated by the target DNS and target router to reach the application which generated the query and request, for example when sufficiently current/updated records responsive to the DNS query and TCP sync request are not found in the DRRHC.

The SOSA may further be adapted to append one or more records to the DRRHC with DNS response and TCP sync response information from respective target network elements associated with the given content source when said information is absent from the DRRHC. The SOSA may be further adapted to update one or more records of the DRRHC with DNS response and TPC sync response information from respective target network elements associated with the given content source when said information is different from that information stored in corresponding records stored of the DRRHC.

According to some embodiments, the Content Source may be integral or otherwise functionally associated with the Mobile Network. Alternatively, the Content Source may be remote from the Mobile Network and may be accessed either through the public internet or through a content delivery/distribution network (CDN) accessible to the Mobile Network or via any other manner. According to further embodiments, data sent from the Content Source to the Mobile Device Application may be received at the Mobile Network through a (TCP/IP) or other protocol network gateway associated with either the Mobile Network Core or with the NAZ of the mobile communication device.

A given SOSA according to embodiments may be communicatively coupled to one or more Access Points associated with one or more NAZ's and may perform any combination of the following functions: (1) Domain Name System (DNS) functions, (2) physical port routing, (3) Internet or external network gateway functions, (4) Network Address Translation (NAT), and (5) NC tunnel data sniffing, data interception and/or data endpoint functions. Accordingly, the SOSA may include or be functionally associated with AP interface circuits and/or AP interface applications providing data connectivity with one or more Mobile Network Access Points. The interface to the Access Points may either be direct or may be through other access network hardware. The SOSA may include or be functionally associated with NC interface circuits and/or NC interface applications providing data connectivity with the NC. The interface to the NC may either be direct or may be through other access network hardware.

A given SOSA may also include or be functionally associated with a DNS server, database and/or cache (hereinafter "DNS"), which DNS may provide domain name resolution services to an Mobile Device Application running on a mobile device requesting DNS service through any of the one or more access points associated with the given SOSA. A DNS associated with a given SOSA and/or a given NAZ may be referred to as a Zone Specific Domain Name System (ZSDNS). Exemplary structures and functionalities of a ZSDNS are described in co-pending U.S. patent application Ser. No. 13/739,067, the teachings of which are hereby incorporated by reference in their entirety. The ZSDNS cache may be a part of the SOSA's DRRHC or may be accessed by the SOSA as a primary or a secondary DNS cache when a record for a given DNS query is not found in the DRRHC.

According to some embodiments, there may be provided an HTTP redirection module, which redirection module may include redirection logic and one or more redirection cache(s). The redirection module may store in the one or more redirection caches HTTP redirects associated with content requests for content from various content sources. The HTTP redirects may point to alternative sources of requested content, for example sources which may be communicatively closer and/or more available to the requesting Mobile Device Application than a Content Source to which the Mobile Device Application's HTTP content request was addressed. Some or all of the redirection logic and/or redirection cache(s) may be discrete, or may be part of a ZSDNS or a DRRHC, each of which ZSDNS or DRRHC may be part of an SOSA.

According to embodiments, an HHTP redirection module be configured with and/or may detect redirection responses for specific HTTP content requests. The redirection module may include, maintain and optionally update a cache include redirection responses to content requests from Content Sources having better and/or cheaper alternative sources. According to some embodiments, the alternative Content Source to which an HTTP request may be redirected may be: (1) part of a CDN integral of otherwise functionally associated with the Mobile Network and/or with a specific NAZ of the Mobile Network, (2) an element of a local content caching system integral of otherwise functionally associated with the Mobile Network and/or with a specific NAZ of the Mobile Network.

Figure 1:
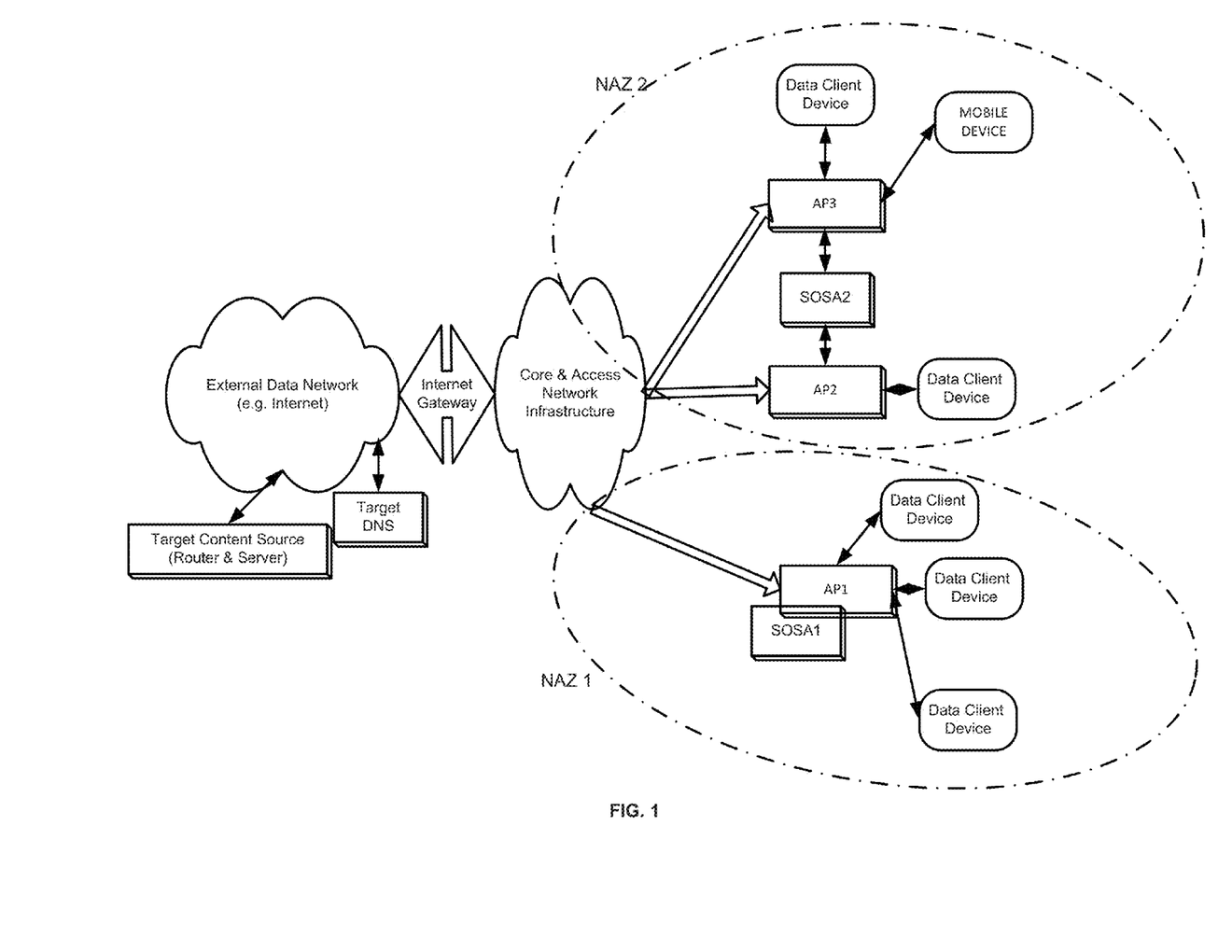
FIG. 1 is a conceptual network diagram of an exemplary data access network including Start of Service Accelerators (SOSA) according to embodiments.

Turning now to FIG. 1, there is shown a conceptual network diagram of a data access network including two Start of Service Accelerators (SOSA), according to embodiments, wherein one SOSA is associated with each of two separate network access zones of the network. According to the example of FIG. 1, SOSA 1 is at least partial integral with Access Point 1 of Network Access Zone 1, while SOSA 2 is communicatively coupled to each of Access Points, 2 and 3, within Network Access Zone. The data client devices shown in FIG. 1 may be any combination of Mobile Devices and/or fixed network computing appliances.

Figure 2A:
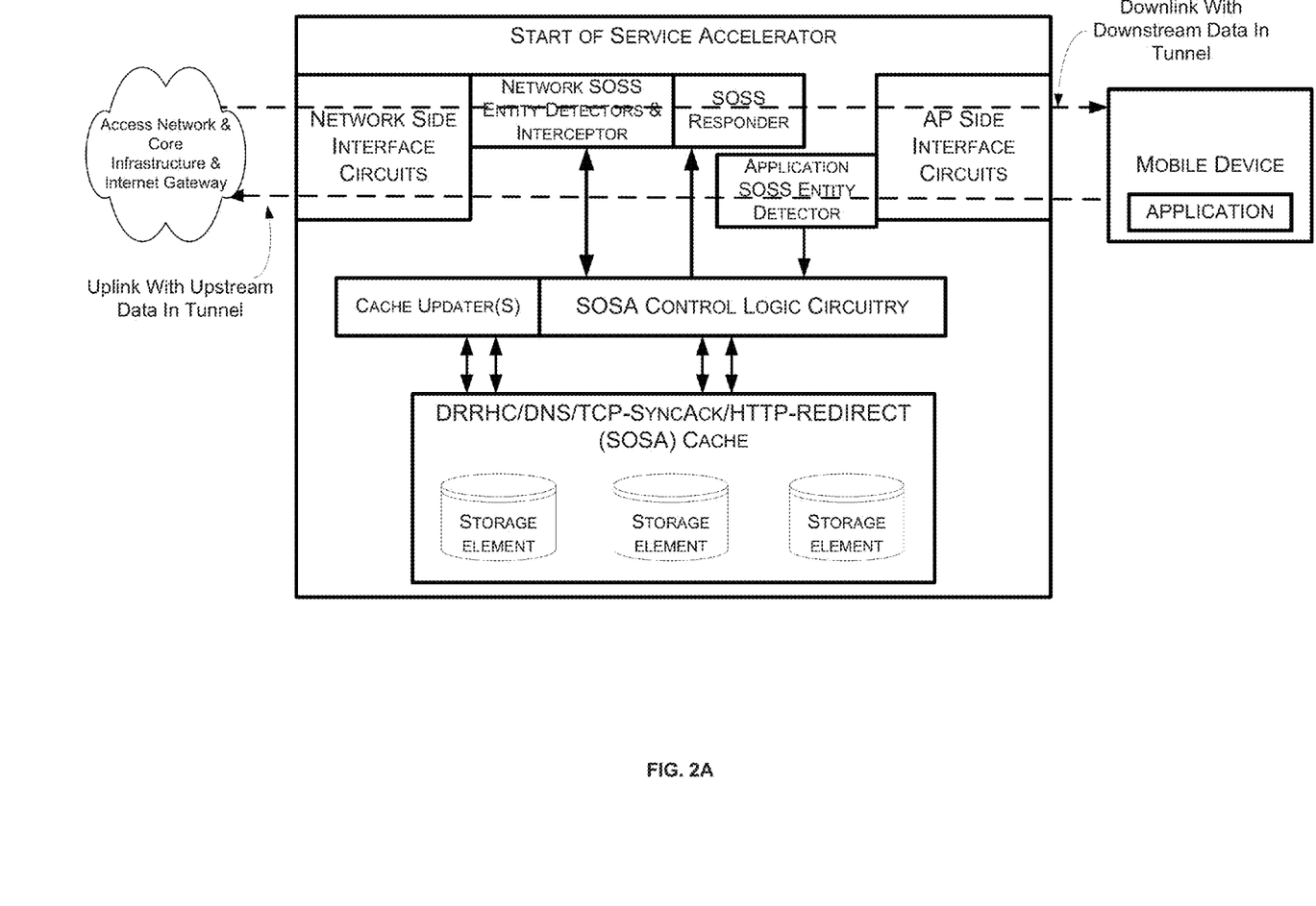
FIG. 2A is a functional block diagram of an exemplary SOSA according to embodiments.
Figure 2B:
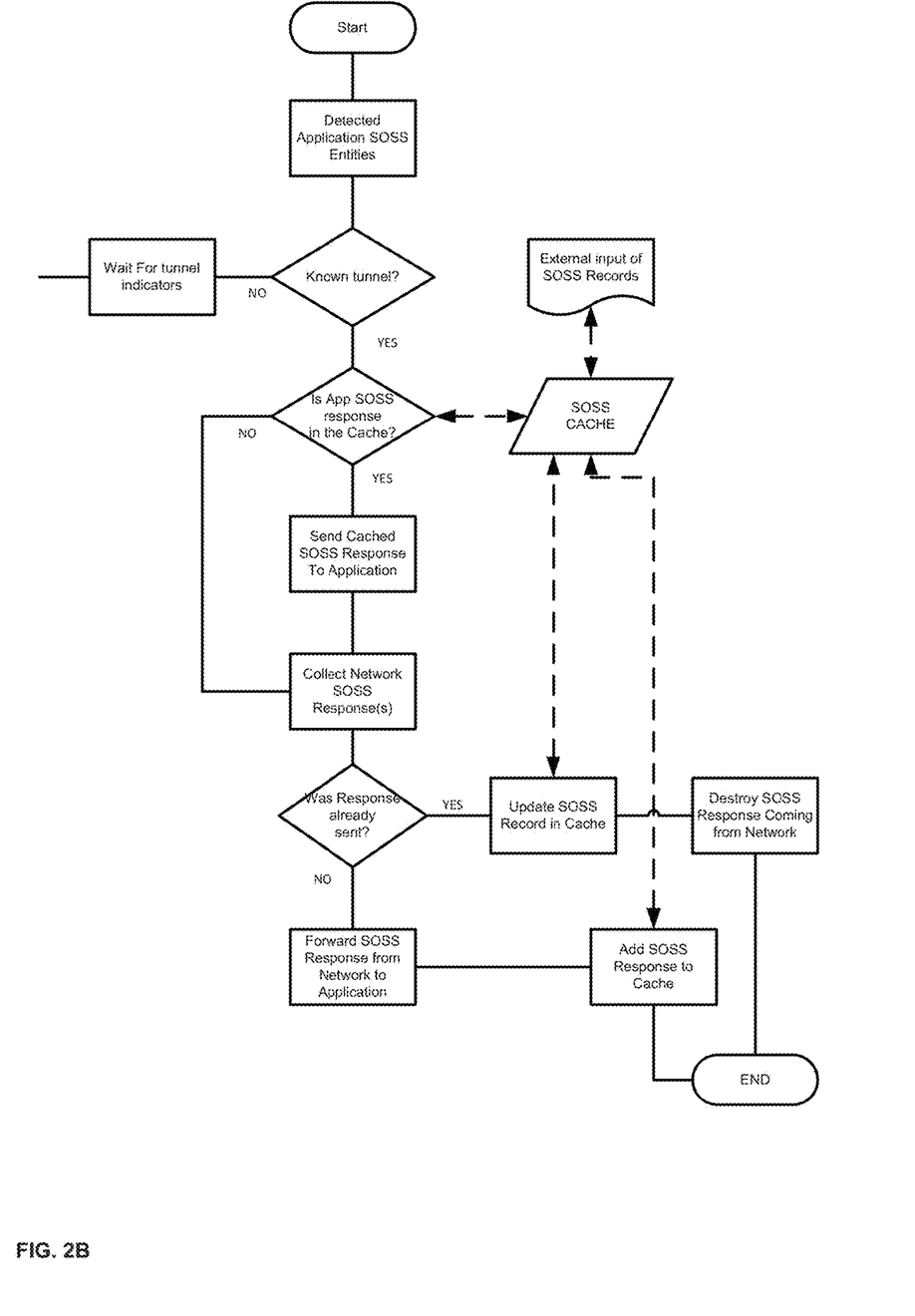
FIG. 2B is a flow chart including steps of an exemplary method for providing start of service acceleration as may be provided by a SOSA according to embodiments.
Figure 2C:
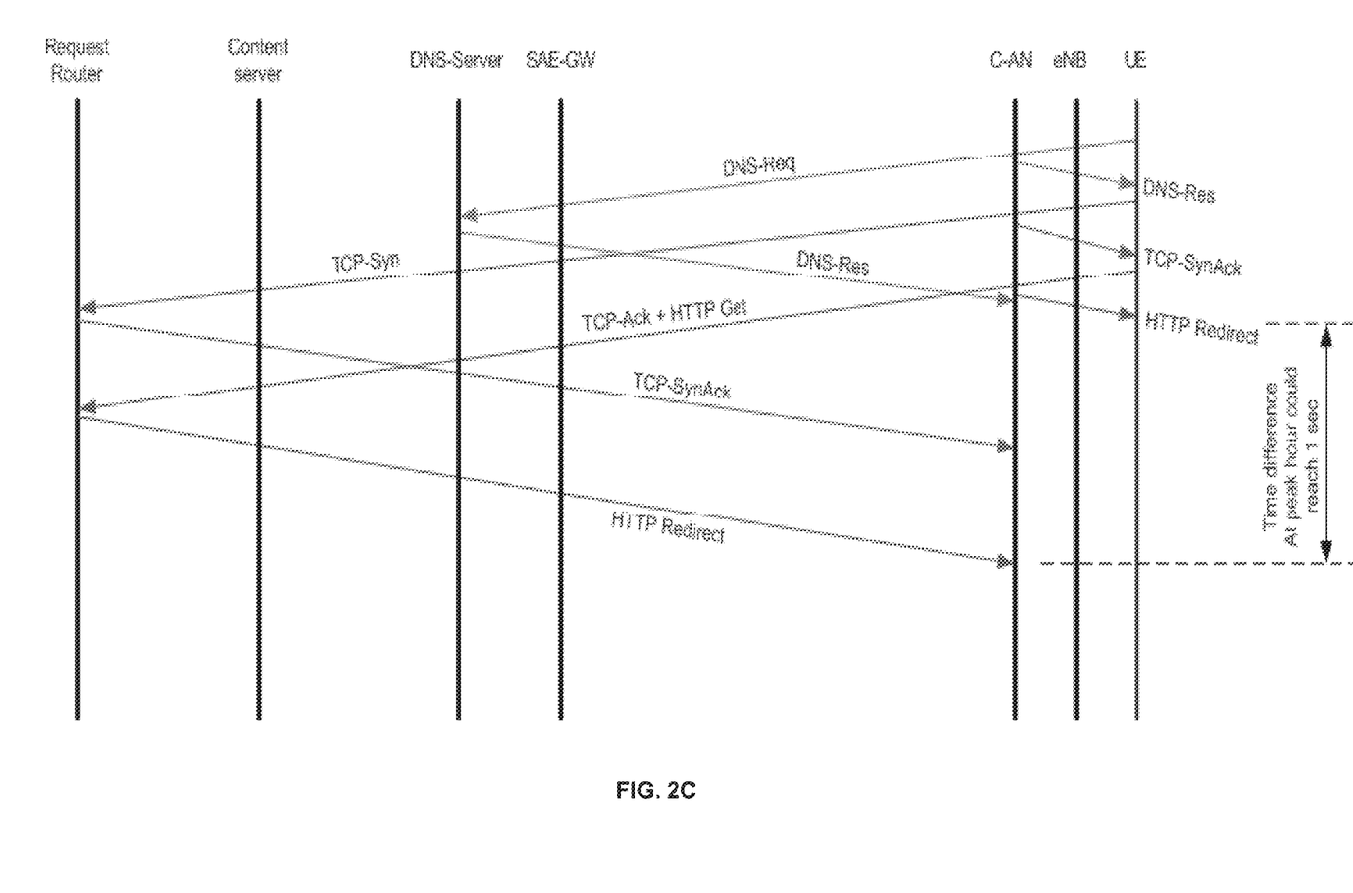
FIG. 2C is signal/information flow diagram corresponding to FIGS. 2A and 2B.

Turning now to FIG. 2, there is shown a functional block diagram of an exemplary SOSA according to embodiments. Operation of the SOSA in FIG. 2A may be described in conjunction with FIG. 2B, which shows a flow chart including steps of an exemplary method for providing start of service acceleration as may be provided by a SOSA according to embodiments, and further in conjunction with FIG. 2C, which is a signal/information flow diagram corresponding to FIGS. 2A and 2B. The SOSA includes AP side interface circuits and Mobile Network Access/Core interface circuits. The AP side interface circuits receive uplink/upstream Mobile Device data, include Mobile Device Application data from one or more AP's of a NAZ with which the SOSA is functionally associated. The Mobile Network Access/Core interface circuits receive downstream and/or downlink data flows from the core of the network and/or from a gateway of the network.

The Application SOSS Entity Detector shown includes a downlink sniffer and a Route Request and Handshake Detector (RRHD). SOSA control logic circuitry checks whether detected Application SOSS Entities correspond to any Network SOSS Entities stored in the SOSA cache, and if so triggers the SOSS responder to inject the relevant cached Network SOSS entities into the downlink back towards the respective Mobile Device Application. The SOSA control logic also instructs the Network SOSS Entity Interceptor to block any corresponding Network SOSS Entities on the downlink, which were generated by target network elements, from reaching the Mobile Device Application. The combination of the control logic and SOSS responder may include a Route Request and Handshake Responder (RRHR) and may also include a TCP sync and HHTP get responder. The terms SOSS responder and Route Request and Handshake Responder may be considered synonymous.

In the event detected Application SOSS Entities don't correspond to any Network SOSS Entities stored in the SOSA cache, the control logic does not cause the interceptor from blocking Network SOSS Entities, generated by the target network elements, on the downstream/downlink line from reaching the Mobile Device Application. Additionally, such non-cached and unblocked Network SOSS Entities may be stored in the SOSA cache as new records and/or may be used to update outdated records.

Figure 3:
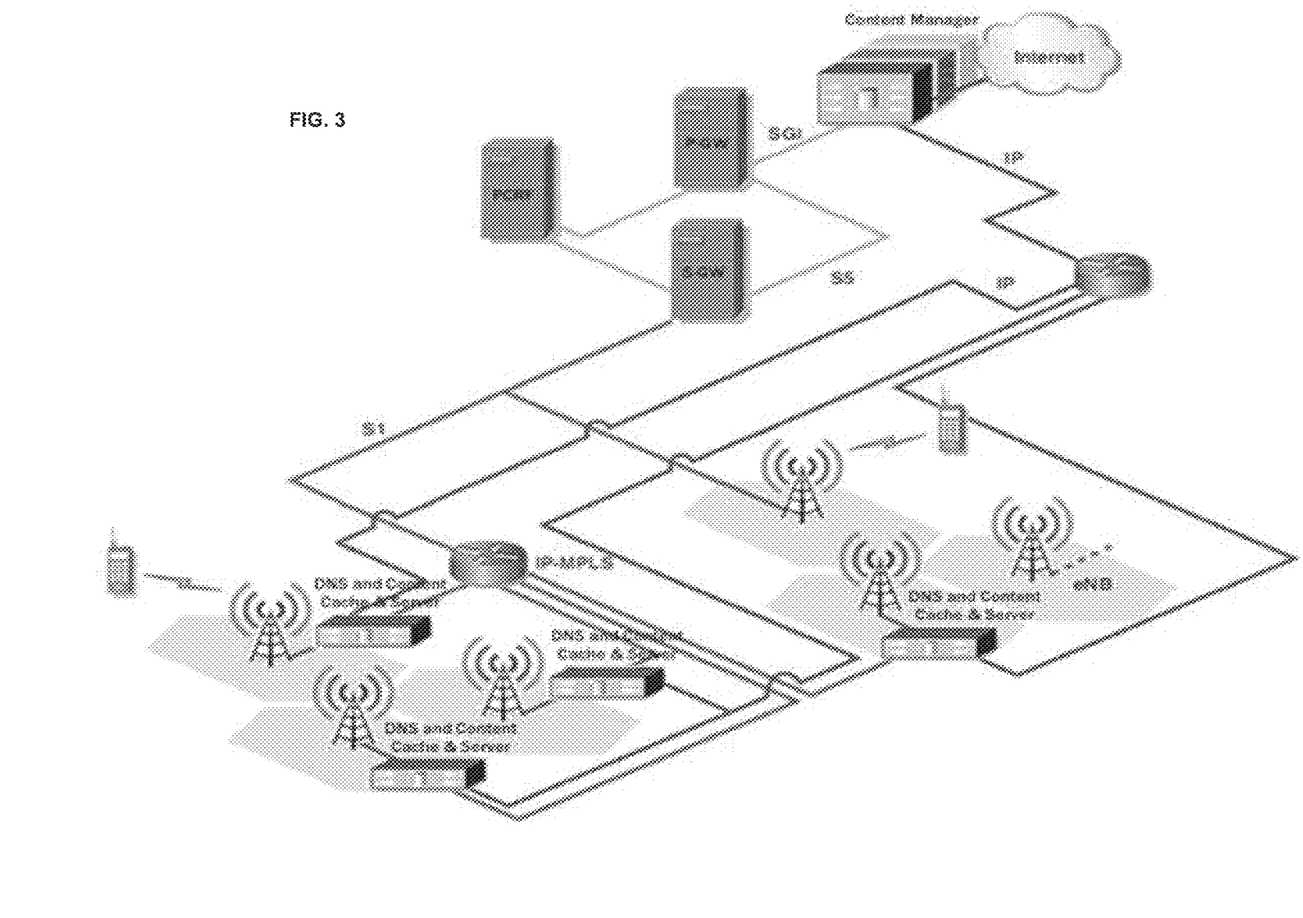
FIG. 3 shows a wireless mobile network.

The signal/information flow diagram terms of FIG. 2C correspond with terminology used as part of the wireless mobile network shown in FIG. 3. All elements shown in FIG. 3 having corresponding functionality to elements coined and described herein may also be referred to by the corresponding coined terms, and likewise, the opposite applies.

It should be understood that the SOSA may support an internal mechanism (table or other) to convert URLs to predefined IP addresses. There may be provided an API via which a remote management system may configure this internal mechanism. This configuration may be done using standard management protocols such as SNMP, Web interface, or any other standard files (Excel or other) which contain all the required localization information, or by any other configuration means. This capability enables the owners of the advertisements and web content to predefine what information will be distributed to users at each NAZ and associated geographic region.

According to further embodiment, the SOSA may run in tunneled areas of the Mobile Network supporting any type on tunnel such as L2TP, GTP, PPP, IuPS, IuB etc. The SOSA, through its sniffers, may listen on all traffic coming from a terminal through a network end point (cell site or other), for example on UDP port 53 or any other port assigned for SOSS in the network to detect SOSS.

It should be understood that according to some embodiments, each of the separate caching entities mentioned may be implemented as separate caches, while according to other embodiments two or more of the caching entities may be combined into a single cache. Likewise, each of the modules, digital logics, data sniffing/detection elements, data blocking/injecting/responding elements, interface elements, network elements and/or decision making elements may be implemented separately and/or combined into the functionality of other Mobile Network associated hardware.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of facilitating Start of Service ("SOS") for a client application running on a Mobile Device communicatively coupled to a Wireless Access Point of a Mobile Network, said method comprising:
monitoring first communications of a first mobile device which are passing through the wireless access point;
detecting, within the first communications, start of service sequence (SOSS) data associated with a first Mobile Device Application initiating start of service with a given content source, wherein the SOSS data includes: (a) Application SOSS Entities generated by the first Mobile Device Application while establishing service with the given content source, and (b) Network SOSS Entities generated by the given content source while establishing service with the first Mobile Device Application;
copying and storing one or more of the Network SOSS Entities;
monitoring second communications passing through the wireless access point;
detecting, within the second communications, a transmission of a second Mobile Device to the given content source, while allowing the transmission to pass to the given content source;
the transmission being a request for start of service from the given content source;
and
responding to the transmission using the stored Network SOSS Entities.

2. The method according to claim 1, wherein detecting includes uplink sniffing and detection of Application SOSS Entities.

3. The method according to claim 1, wherein detecting includes a downlink sniffing and detection of Network SOSS Entities.

4. The method according to claim 1, further comprising a downlink data intercepting to selectively block Network SOSS Entities from reaching a Mobile Device Application.

5. The method according to claim 4, wherein downlink data intercepting blocks Network SOSS Entities from reaching the second Mobile Device.

6. The method according to claim 1, further comprising appending and updating records of a cache with received Network SOSS Entities.

7. The method according to claim 6, wherein appending includes appending one or more records including Network SOSS Entities generated by a target DNS in response to a given set of Application SOSS Entities when records with Network SOSS Entities corresponding to the given set of Application SOSS Entities are not stored.

8. The method according to claim 6, wherein updating includes updating one or more records associated with a given content source with Network SOSS Entities generated by a target DNS when the one or more records are outdated.

9. The method according to claim 1, further comprising HTTP redirection in response to a detected Mobile Device Application HTTP request.

10. The method to claim 9, wherein said HTTP redirection includes responding to the detected Mobile Device Application HTTP request with a stored redirect response.

11. A Start of Service Accelerator ("SOSA") functionally associated with a Wireless Access Point of a Mobile Network, said SOSA comprising:
one or more data stream sniffers communicatively coupled to the access point and adapted to:
i. monitor first communications of a first mobile device which are passing through the wireless access point;
ii. detect, within the first communications, start of service sequence (SOSS) data associated with a first Mobile Device Application initiating start of service with a given content source, wherein the SOSS data includes: (a) Application SOSS Entities generated by the first Mobile Device Application while establishing service with the given content source, and (b) Network SOSS Entities generated by the given content source while establishing service with the first Mobile Device Application;
a Data Request Routing & Handshake Cache (DRRHC) adapted to copy and store one or more of the Network SOSS Entities;
one or more second data stream sniffers communicatively coupled to the access point and adapted to:
(a) monitor second communications passing through the wireless access point; and (b) detect, within the second communications, a transmission of a second Mobile Device to the given content source, while allowing the transmission to pass to the given content source;
the transmission being a request for start of service from the given content source; and
a Route Request and Handshake Responder (RRHR) adapted to respond to the transmission using Network SOSS Entities stored on said DRRHC.

12. The SOSA according to claim 11, wherein said one or more data stream sniffers includes an uplink sniffer functionally associated with a Route Request and Handshake Detector (RRHD) adapted to detect Application SOSS Entities.

13. The SOSA according to claim 11, wherein said one or more sniffers includes a downlink sniffer functionally associated with a Route Request and Handshake Detector (RRHD) adapted to detect Network SOSS Entities.

14. The SOSA according to claim 11, further comprising a downlink data interceptor adapted to selectively block Network SOSS Entities from reaching a Mobile Device Application.

15. The SOSA according to claim 14, wherein said downlink data interceptor is adapted to block Network SOSS Entities from reaching the second Mobile Device.

16. The SOSA according to claim 11, further comprising a cache updater adapted to append and update records in said DRRHC.

17. The SOSA according to claim 16, wherein said cache updater is adapted to append to said DRRHC one or more records including Network SOSS Entities generated by a target DNS in response to a given set of Application SOSS Entities when records with Network SOSS Entities corresponding to the given set of Application SOSS Entities are not found in said DRRHC.

18. The SOSA according to claim 16, wherein said cache updater is adapted to update one or more records in said DRRHC associated with a given content source with Network SOSS Entities generated by a target DNS when the one or more records in said DRRHC are outdated.

19. The SOSA according to claim 11, further comprising a redirection module adapted to trigger a HTTP redirect in response to a detected Mobile Device Application HTTP request.

20. The SOSA according to claim 19, wherein said HTTP redirection module comprises HTTP redirect logic and an HTTP redirect cache, and wherein said redirection module signals said Route Request and Handshake Responder (RRHR) to respond to the detected Mobile Device Application HTTP request with a redirect response stored in said HTTP redirect cache.

21. A Mobile Communication Network comprising:
one or more Wireless Access Points; and
a Start of Service Accelerator ("SOSA") functionally associated with a Wireless Access Point of said Mobile Communication Network, said SOSA comprising:
(1) one or more data stream sniffers communicatively coupled to the access point and adapted to:
(i) detect, within the first communications, start of service sequence (SOSS) data associated with a first Mobile Device Application initiating start of service with a given content source, wherein the SOSS data includes: (a) Application SOSS Entities generated by the first Mobile Device Application while establishing service with the given content source, and (b) Network SOSS Entities generated by the given content source while establishing service with the first Mobile Device Application;
(2) a Data Request Routing & Handshake Cache (DRRHC) adapted to copy and store one or more of the Network SOSS Entities;
(3) one or more second data stream sniffers communicatively coupled to the access point and adapted to:
(a) monitor second communications passing through the wireless access point; and
(b) detect, within the second communications, a transmission of a second Mobile Device to the given content source, while allowing the transmission to pass to the given content source;
the transmission being a request for start of service from the given content source; and
(4) a Route Request and Handshake Responder (RRHR) adapted to respond to the transmission using Network SOSS Entities stored on said DRRHC.

22. A Mobile Communication Network according to claim 21, wherein said one or more data stream sniffers includes an uplink sniffer functionally associated with a Route Request and Handshake Detector (RRHD) adapted to detect Application SOSS Entities.

23. A Mobile Communication Network according to claim 21, wherein said one or more sniffers includes a downlink sniffer functionally associated with a Route Request and Handshake Detector (RRHD) adapted to detect Network SOS S Entities.

24. A Mobile Communication Network according to claim 21, further comprising a downlink data interceptor adapted to selectively block Network SOSS Entities from reaching a Mobile Device Application.

25. A Mobile Communication Network according to claim 24, wherein said downlink data interceptor is adapted to block Network SOSS Entities from reaching the second Mobile Device.

26. A Mobile Communication Network according to claim 21, further comprising a cache updater adapted to append and update records in said DRRHC.

27. A Mobile Communication Network according to claim 26, wherein said cache updater is adapted to append to said DRRHC one or more records including Network SOSS Entities generated by a target DNS in response to a given set of Application SOSS Entities when records with Network SOSS Entities corresponding to the given set of Application SOSS Entities are not found in said DRRHC.

28. A Mobile Communication Network according to claim 26, wherein said cache updater is adapted to update one or more records in said DRRHC associated with a given content source with Network SOSS Entities generated by a target DNS when the one or more records in said DRRHC are outdated.

29. A Mobile Communication Network according to claim 21, further comprising a redirection module adapted to trigger a HTTP redirect in response to a detected Mobile Device Application HTTP request.

30. A Mobile Communication Network according to claim 29, wherein said HTTP redirection module comprises HTTP redirect logic and an HTTP redirect cache, and wherein said redirection module signals said Route Request and Handshake Responder (RRHR) to respond to the detected Mobile Device Application HTTP request with a redirect response stored in said HTTP redirect cache.

* * * * *